June 4, 1940.    W. KÖNIG    2,203,596
PROCESS FOR THE MANUFACTURE OF TRANSPARENT FOILS,
FILM, AND THREADS OF CELLULOSE FORMATE
Filed Oct. 21, 1935
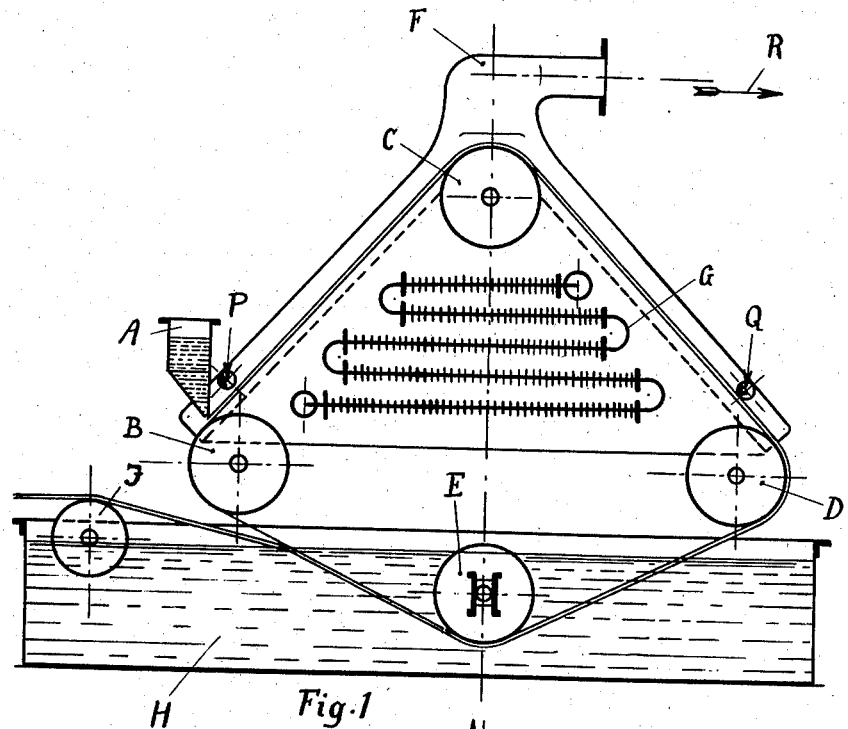
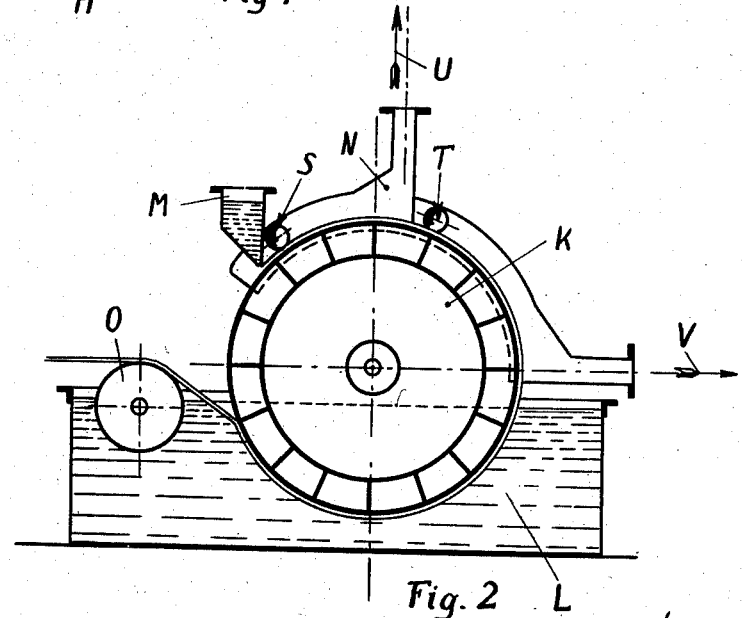
Inventor:
Walter König
Attorneys:

Patented June 4, 1940

2,203,596

UNITED STATES PATENT OFFICE 2,203,596

PROCESS FOR THE MANUFACTURE OF TRANSPARENT FOILS, FILMS, AND THREADS OF CELLULOSE FORMATE

Walter König, Wiesbaden, Germany, assignor to the firm Rudolph Koepp & Co., Chemische Fabrik A. G., Oestrich (Rheingau), Germany, a corporation of Germany Application October 21, 1935, Serial No. 46,027
In Germany October 22, 1934

9 Claims. (Cl. 18—57)

This invention relates to a process for the manufacture of transparent cellulose formate products, particularly foils, films and threads.

The utilisation of cellulose formate, which is in itself easily obtainable, for the manufacture of foils, films, threads and the like has hitherto not achieved any technical importance. The reason for this is chiefly to be found in the fact that cellulose formate is insoluble in the solvents, such as acetone, dioxane, butyl acetate and the like, usually employed in the industry. This disadvantage can be overcome by working up the primary reaction products, obtained by the action of formic acid on cellulose, in a suitable precipitating bath by the wet-spinning process. Thus it has been proposed to manufacture artificial threads by precipitating cellulose formate with water or aqueous salt solutions. Experiments have shown, however, that non-transparent, white and cloudy threads are obtained in this manner, which for many purposes are unserviceable. When applying this process to the manufacture of foils or films, only opaque white foils or films are likewise obtained.

According to this invention it has been found that transparent cellulose formate products, particularly foils, films and threads, can be manufactured, by pre-shaping the reaction products directly obtained by formylating cellulose before precipitating with water on aqueous solutions and removing the greater part of the formic acid contained in the mass by evaporation. It has been further found that the process may also be carried into effect by employing organic precipitating baths, for example alcohol or alcoholic solutions, instead of aqueous precipitating baths.

The primary reaction products obtained during the formylation of the cellulose may, after pre-shaping, be freed from a portion of the formic acid in various ways. The evaporation of the formic acid may be effected in apparatus similar to those usually employed for such purposes in the artificial material industry, particularly the foil and artificial silk industries. The formic acid may with advantage be evaporated with the aid of hot gases, particularly a hot current of air. The process of evaporation may also be carried out under a vacuum. In order to recover the evaporated formic acid, the air-formic acid mixture, which may sometimes also contain a little water, is cooled and the formic acid condensed thereby. Since highly concentrated formic acid is extraordinarily volatile and can only be condensed with difficulty, the recovery of the formic acid may also be effected by absorption by solvents. Suitable solvents are those from which the formic acid can be readily separated by simple or azeotropic distillation, for example organic bases, the acid or neutral formates of which can be readily decomposed by distillation, or solvents, such as cyclohexanone and other high boiling ketones, formanilide, furfural or nitrobenzene. The use of these solvents also enables the formic acid, insofar as it contains water, to be concentrated in a simple manner.

Immediately after drying, the pre-shaped mass is treated with precipitating agents, for example drawn through a suitable precipitating bath, whereby glass-clear foils, films, threads and the like are obtained.

The process of this invention, as applied, for example, to the manufacture of foils, may be carried out continuously as follows, reference being had to the accompanying drawing, in which Fig. 1 is a diagrammatic showing of one type of apparatus for carrying out my invention.

Fig. 2 is a similar view of a modification of the same.

The products of formylation, obtained for example according to Patent 1,900,599, in the form of a highly viscous plastic mass, are introduced from the reservoir A (Figure 1) and applied in a thin layer on to an endless belt, which is conveyed between rollers B, C, D, E. The upper part of the belt is covered by the hood F, which is connected with a condenser or absorption vessel. On the upper half of the belt the formic acid is evaporated by air, which is heated by the heating element G, and conveyed away to the condenser. The lower half of the endless belt travels through the aqueous precipitating bath H and the film produced is finally removed by the roller J.

According to another embodiment of this invention a drum K (Figure 2) may be emloyed in place of the endless belt. The interior of this drum is subdivided into individual segments by means of a cell-like construction, with the aid of which the drum segments emerging from the precipitating bath L can be heated, for example by steam. The distribution of steam to the individual cells is effected by means of a steering head disposed concentrically on the axle. The formylation mass issuing from the reservoir M is applied by suitable devices in a uniform layer on to the drum. A part of the formic acid present evaporates in the upper heated section of the drum and can be removed with the aid of the hood N to the condenser or absorption vessel. The direct heating of the drum can, if necessary, be promoted by a hot air current. The lower part of the drum is immersed in a precipitating bath and when the drum again emerges the film formed is withdrawn from the drum and out of the bath over the roller O.

Formylation products obtained in any other manner can, of course, also be employed in the process of this invention.

The process of the invention for the manufacture of transparent cellulose formate products by combining dry- and wet-spinning processes is attended with considerable advantages.

The primary reaction products of the formylation of cellulose obtainable by very varied processes can be directly worked up, whereby reprecipitation and re-solution of cellulose formate are dispensed with.

A large portion of the formic acid is recovered in a highly concentrated form during the heat-treatment of the pre-shaped reaction masses, whilst according to the processes hitherto employed for working up the cellulose formate the entire formic acid is obtained in the form of a dilute aqueous solution and has to be regenerated at great expense.

The films, foils, threads and other products manufactured by the process of this invention are distinguished by their great tensile strength and high resisting powers.

P, Q are the inlet openings for the hot air, the arrows R demonstrate the ways to the condenser.

In Fig. 2, S and T represent the inlet openings for the hot air and U and V indicate the outlets leading to the condenser.

What I claim is:

1. A process for the manufacture of transparent foils, films and threads of cellulose formate, which comprises the steps of preshaping primary formylated cellulose reaction products which contain formic acid, partially drying the preshaped products while evaporating a portion of the formic acid present, and finally treating the partially dried products with a liquid precipitating agent.

2. A process according to claim 1, wherein the preshaped products are partially dried and a portion of the formic acid evaporated by passing hot gases thereover.

3. A process according to claim 1, wherein the products, after being partially dried and freed from a portion of the formic acid, are conveyed through precipitating baths.

4. A process according to claim 1, wherein water is employed as precipitating agent.

5. A process according to claim 1, wherein aqueous solutions are employed as precipitating agents.

6. A process according to claim 1, wherein organic liquids are employed as precipitating agents.

7. A process for producing sheets and films of cellulose formate, comprising drying a layer of a solution containing cellulose formate, water and formic acid until the layer is non-flowing and thereafter precipitating the cellulose formate in said layer.

8. A process for producing transparent sheets and films of cellulose formate, comprising casting a solution of cellulose formate in formic acid in the form of a thin layer, evaporating the major portion of the formic acid from said layer to coagulate the layer in the form of a sheet or film, and thereafter precipitating the cellulose formate in said layer.

9. A process for producing transparent sheets and films of cellulose formate, comprising preparing a solution of cellulose formate in formic acid, casting a thin layer of said solution upon a moving support, passing said layer first through a heated zone to evaporate formic acid from said layer and thereafter through a bath of water for precipitating the cellulose formate in said layer, and stripping the sheet or film from said support.

WALTER KÖNIG.